United States Patent
Kawamura

(10) Patent No.: US 8,421,849 B2
(45) Date of Patent: Apr. 16, 2013

(54) LIGHTING APPARATUS

(75) Inventor: Ryo Kawamura, Tokyo (JP)

(73) Assignee: Panasonic Corporation, Osaka (JP)

( * ) Notice: Subject to any disclaimer, the term of this patent is extended or adjusted under 35 U.S.C. 154(b) by 563 days.

(21) Appl. No.: 12/670,425

(22) PCT Filed: Jul. 23, 2008

(86) PCT No.: PCT/JP2008/063172
§ 371 (c)(1),
(2), (4) Date: Jan. 25, 2010

(87) PCT Pub. No.: WO2009/014137
PCT Pub. Date: Jan. 29, 2009

(65) Prior Publication Data
US 2010/0231694 A1 Sep. 16, 2010

(30) Foreign Application Priority Data

Jul. 26, 2007 (JP) .................................. 2007-194856
Jul. 22, 2008 (JP) .................................. 2008-188848

(51) Int. Cl.
*H04N 13/04* (2006.01)
(52) U.S. Cl.
USPC .................. 348/51; 348/E13.037; 359/24
(58) Field of Classification Search .................. 348/51, 348/E13.037; 359/24
See application file for complete search history.

(56) References Cited

U.S. PATENT DOCUMENTS 6,323,971 B1 * 11/2001 Klug .................... 359/24
6,554,431 B1    4/2003 Binsted et al.
2006/0266135 A1   11/2006 Nishikawa et al.
2006/0268242 A1 * 11/2006 Belliveau .................... 353/94
2008/0048586 A1    2/2008 Hasegawa et al.
2008/0157693 A1    7/2008 Yamamoto et al.
2008/0191627 A1    8/2008 Hamada et al.
2009/0051291 A1    2/2009 Tsuzuki et al.
2010/0026200 A1    2/2010 Sakai et al.

FOREIGN PATENT DOCUMENTS

| JP | 5-249428 | 9/1993 |
| JP | 2000-352761 | 12/2000 |
| JP | 2003-186112 | 7/2003 |
| JP | 2003-187615 | 7/2003 |

(Continued)

OTHER PUBLICATIONS

Korea Office action dated Apr. 25, 2011.

(Continued)

*Primary Examiner* — Kyung H Shin
(74) *Attorney, Agent, or Firm* — Greenblum & Bernstein P.L.C.

(57) ABSTRACT

A lighting control device includes: an irradiation light generation unit that receives an irradiation light signal; coating correcting means for correcting the irradiation light signal so that an irradiation target object can be coated with irradiation light; and an irradiation light projection unit that projects the irradiation light by using the corrected irradiation light signal. The irradiation light includes coating light that coats the irradiation target object, and background light that becomes a background of the irradiation target object. The lighting control device includes: a first coating correction unit that corrects the irradiation light signal so as to cut an outline of the coating light in conformity with a shape of the irradiation target object; and a second coating correction unit that corrects the outline of the coating light in response to a positional relationship between an origin position of the irradiation target object and the irradiation light projection unit.

9 Claims, 12 Drawing Sheets

FOREIGN PATENT DOCUMENTS

| | | |
|---|---|---|
| JP | 2005-201926 | 7/2005 |
| JP | 2006-308962 | 11/2006 |
| JP | 2006-338181 | 12/2006 |
| JP | 2007-108740 | 4/2007 |

OTHER PUBLICATIONS

China Office action dated Apr. 8, 2011, along with an english translation thereof.

Japan Office action dated Oct. 11, 2011, along with an English translation thereof.

China Office action, dated Oct. 19, 2011 along with an english translation thereof.

Egghouse website—http://www.egghouse.com/gobo/about.htm, and machine translation.

Ushio Lighting DL.2 product website—http://www.ushiolighting.co.jp/product/productimage/pdf/d12, and English language translation.

* cited by examiner (a)  (b)

(a)

(b)

(a)

(b)

(a)

(b)

(a)

(b)

LIGHTING APPARATUS

TECHNICAL FIELD

The present invention relates to a lighting apparatus that irradiates irradiation light onto an instrument as a control target having an arbitrary shape so as to cover a surface thereof.

BACKGROUND ART

Heretofore, in a lighting apparatus that irradiates irradiation light having an arbitrary shape, as described in "http://www.egghouse.com/gobo/about.htm" and "http://www.ushiolighting.co.jp/product/productimage/pdf/d12.pdf", a filter called a gobo or a mask is installed to a projection instrument, and a projected portion onto which the irradiation light is emitted from the projection instrument is shaded. In such a way, the irradiation light that has passed through the filter turns to a state of being clipped into a specific shape. Specifically, in the conventional lighting system, a filter (such as the gobo) clipped into a base shape composed of a circle, a triangle, a square or the like is attached to the projection instrument, and a shape is given to an outline of the irradiation light.

Moreover, in the conventional lighting system, in the case where the irradiation light is desired to be irradiated only onto an object as an irradiation target, after a projection position of the irradiation light emitted from the projection instrument is aligned to a position of the object as the irradiation target, an operation is performed, which is to match a rough outline of the irradiation light with a shape of the object as the irradiation target by a diaphragm function and zoom function of the projection instrument.

Furthermore, heretofore, there has been a lighting system that performs space direction by using a projector as the projection instrument in place of a lighting appliance. The lighting appliance for use in this lighting system is also called a moving projector. This moving projector emits video light as the irradiation light. Therefore, the moving projector is capable of freely setting the shape and color of the irradiation light, and changing the irradiation light as a moving picture.

However, even in this lighting system, in the case of giving the shape to the irradiation light, there is adopted a technique for roughly matching the outline of the irradiation light with the shape of the object as the irradiation target by using the base shape in a similar way to the conventional lighting system.

Still further, heretofore, a technology described in Japanese Patent Laid-Open No. 2006-338181 has been known as a stereoscopic display device capable of effectively expressing a surface texture of an object on a three-dimensional shape model.

However, in the above-mentioned conventional lighting system, though the outline of the irradiation light can be changed in conformity with the shape of the object as the irradiation target, the outline of the irradiation light, which is made by the filter composed of the circle, the triangle, the square or the like, is used as the base, and therefore, it has been difficult to accurately match the shape of the irradiation light with the outline of the object as the irradiation target though the shape of the irradiation light can be roughly matched with the outline of the object as the irradiation target. In other words, in the conventional lighting system, it has been difficult to change the outline of the irradiation light in conformity with an object as the irradiation target, which has an arbitrary shape.

In this connection, the present invention has been proposed in consideration of the above-mentioned actual circumstances. It is an object of the present invention to provide a lighting apparatus capable of coating the object as the irradiation target, which has the arbitrary shape, with the irradiation light with high accuracy.

DISCLOSURE OF THE INVENTION

The present invention is a lighting apparatus that projects irradiation light toward an irradiation target object having an arbitrary shape, including: irradiation light signal inputting means for receiving an irradiation light signal; coating correcting means for correcting the irradiation light signal received by the irradiation light signal inputting means so that the irradiation target object can be coated with the irradiation light when the irradiation light is irradiated onto the irradiation target object; and irradiation light projecting means for projecting the irradiation light onto the irradiation target object by using the irradiation light signal corrected by the coating correcting means. In the lighting apparatus as described above, the irradiation light includes coating light that coats the irradiation target object, and background light that becomes a background of the irradiation target object.

In order to solve the above-described problem, the coating correcting means corrects the irradiation light signal so as to correct an outline of the coating light in the irradiation light, and the coating correcting means includes: first coating correcting means for correcting the irradiation light signal so as to cut the outline of the coating light in the irradiation light in conformity with the shape of the irradiation target object; and second coating correcting means for correcting the outline of the coating light, the outline being corrected by the first coating correcting means, in response to a positional relationship between an origin position of the irradiation target object and the irradiation light projecting means.

BEST MODE FOR CARRYING OUT THE INVENTION

A description will be made below of an embodiment of the present invention with reference to the drawings.

Figure 1:
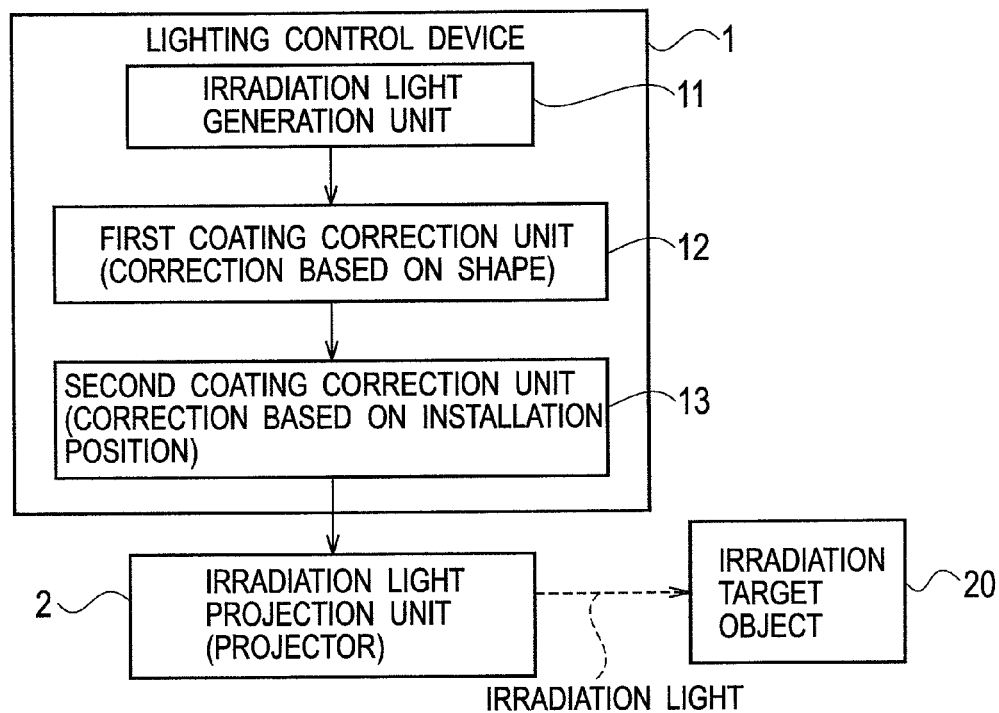
FIG. 1 is a block diagram showing a configuration of a coating lighting apparatus to which the present invention is applied.
Figure 2:
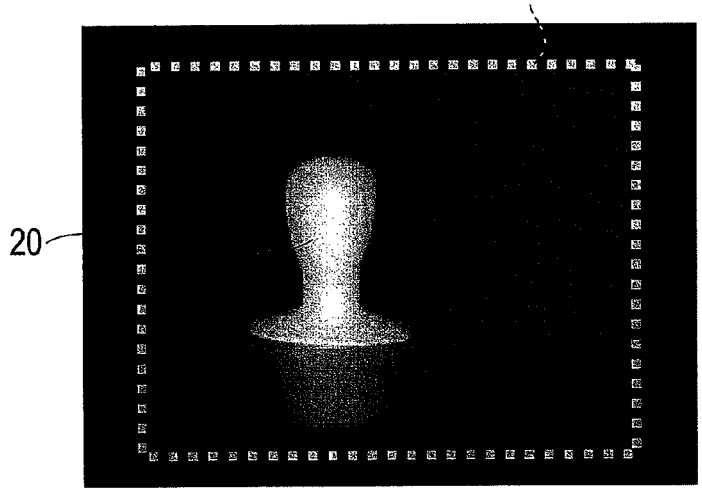
FIG. 2 is a view showing a state where an object as an irradiation target, which has an arbitrary shape, is coated by the coating lighting apparatus to which the present invention is applied.

The present invention is applied to a coating lighting apparatus composed of a lighting control device 1 and an irradiation light projection unit 2, which is configured, for example, as shown in FIG. 1. This coating lighting apparatus projects irradiation light toward an object 20 as an irradiation target having an arbitrary shape, and thereby allows such an irradiation target object 20 to be observed as if the monochromatic irradiation light coated the irradiation target 20 as shown in FIG. 2. Moreover, without being limited to the monochromatic irradiation light, the coating lighting apparatus may coat the irradiation target object 20 with irradiation light of a plurality of colors or a video.

Figure 3:
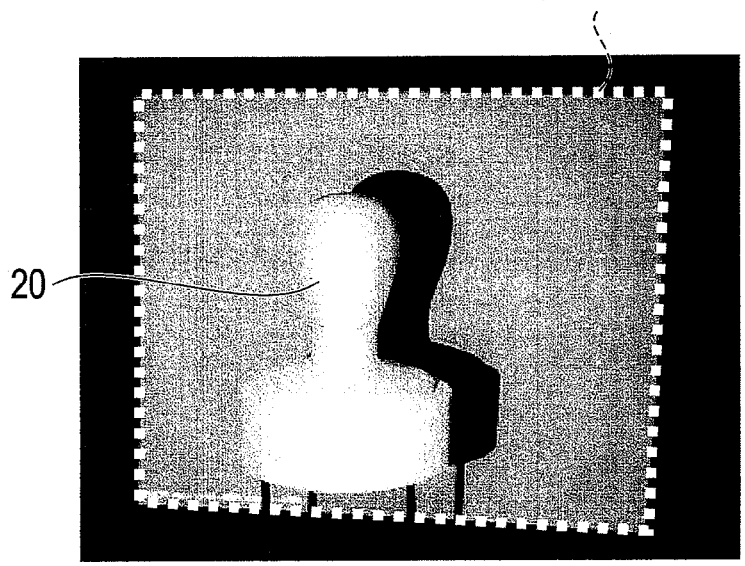
FIG. 3 is a view showing a state where light is irradiated onto the entirety of an irradiation light projection range.

In usual, when the monochromatic irradiation light is emitted from a projector toward the entirety of an irradiation light projection range, then as shown in FIG. 3, the irradiation light is also irradiated onto a region other than the irradiation target object 20, and a shadow is cast behind the irradiation target object 20. As opposed to this, as shown in FIG. 2, the monochromatic irradiation light is projected only onto a surface of the irradiation target object 20, and irradiation light of a background color is projected onto a background of the irradiation target object 20. In such a way, the irradiation target object 20 is coated with the monochromatic irradiation light. Note that, in the following description, the irradiation light for coating the irradiation target object 20 as shown in FIG. 2 is referred to as "coating light", and the irradiation light that becomes the background of the irradiation target object 20 is referred to as "background light".

Figure 4:
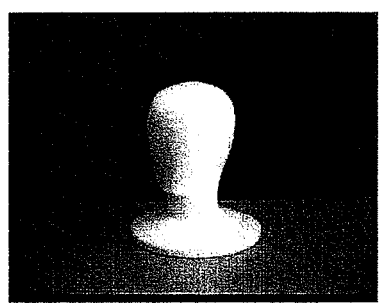
FIGS. 4(a) and 4(b) are views explaining shape data of the object as the irradiation target in the coating lighting apparatus to which the present invention is applied.
Figure 4:
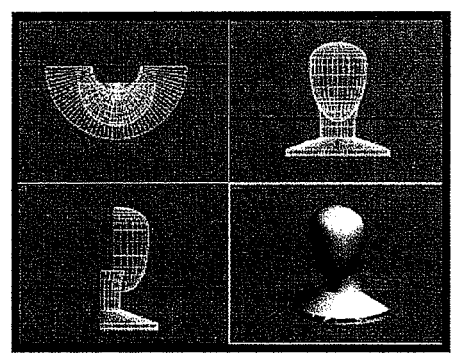

As shown in FIG. 4(a), the irradiation target object 20 is a three-dimensional object having an arbitrary shape. As shown in FIG. 4(b), by a computer graphic technology, this irradiation target object 20 is reproduced three-dimensionally, and shape data in every direction is analyzed. Moreover, by an image sensing technology, the irradiation target object 20 may be reproduced three-dimensionally from a photographed image of the irradiation target object 20. This shape data is supplied to the lighting control device 1, and is used for image correction processing in a first coding correction unit 12 and a second coding correction unit 13, which will be described later.

As will be described later, the coating lighting apparatus implements distortion correction processing for an irradiation light signal and outputs the irradiation light to the irradiation light projection unit 2 in order to coat the irradiation target object 20 with the irradiation light. Hence, the irradiation target object 20 is not particularly limited, and may be an irregular object, or a space composed of an even flat surface (or curved surface). However, it is desirable that the surface of the irradiation target object 20 be processed by a screen material and the like in order to enhance reproducibility of a tone of the irradiation light projected from the irradiation light projection unit 2.

The irradiation light projection unit 2 is composed of a projector that receives the irradiation light signal transmitted from the lighting control device 1, and emits the irradiation light formed of the coating light and the background light.

The lighting control device 1 includes: an irradiation light generation unit 11; the first coating correction unit 12; and the second coating correction unit 13. Note that, though the lighting control device 1 shown in FIG. 1 is composed of hardware formed of a computer including a CPU, a ROM, a RAM, a storage device and the like, a description will be made of each of divided functional groups in FIG. 1 for the sake of convenience.

The irradiation light generation unit 11 functions as irradiation light signal input means for receiving the irradiation light signal. The irradiation light generation unit 11 may receive the irradiation light signal from an external personal computer, or may generate a monochromatic irradiation light signal by designating a color of monochromatic light. Moreover, this irradiation light signal is generated as a two-dimensional video.

With regard to this irradiation light signal, for example, in the case of using monochromatic lighting light as the coating light as shown in FIG. 3, the entirety of the irradiation light projection range is a monochromatic video signal. Moreover, also in the case where the irradiation light generation unit 11 uses, as the coating light, irradiation light including a pattern image or video with a plurality of colors, the entirety of the irradiation light projection range is a video signal including the pattern image or the video. The irradiation light signal received or generated by the irradiation light generation unit 11 is supplied to the first coating correction unit 12 and the second coating correction unit 13.

The first coating correction unit 12 and the second coating correction unit 13 correct the irradiation light signal supplied from the irradiation light generation unit 11 so that the irradiation target object 20 can be coated with the irradiation light when the irradiation light is irradiated onto the irradiation target object 20. The first coating correction unit and the second coating correction unit 13 correct the irradiation light signal so that an outline of the coating light included in the irradiation light can coincide with an outline of the irradiation target object 20.

The first coating correction unit 12 corrects the irradiation light signal so as to cut the outline of the coating light included in the irradiation light in conformity with a shape of the irradiation target object 20. In such a way, the first coating correction unit 12 performs cutting processing for an irradiation range of the coating light so as to project the coating light only onto the irradiation target object 20, and to project the background light onto the region other than the irradiation target object 20.

The first coating correction unit 12 as described above receives a two-dimensional video 100 created by the irradiation light generation unit 11 as shown in FIG. 5(a). Next, the first coating correction unit 12 receives shape data 20' of the irradiation target object 20 as a coordinate parameter as shown in FIG. 5(b), and performs mapping processing for pasting the two-dimensional video 100 to the shape data 20' of the irradiation target object 20. In this mapping processing, an arithmetic operation is performed as to on which portion of the irradiation target object 20 each of pixels of the two-dimensional video 100 is projected. By this mapping processing, the first coating correction unit 12 decides a correlation between each pixel of the two-dimensional video 100 and a coordinate on the irradiation target object 20.

In such a way, as shown in FIG. 5(c), the two-dimensional video 100 becomes a three-dimensional video 100' subjected to coordinate conversion by the shape data 20'. Here, in the two-dimensional video 100, a video portion excluded from the shape data 20' is eliminated, and only a video portion that can be mapped on the shape data 20' is left. Specifically, a portion that does not become the coating light becomes the background light.

As in FIG. 5(d), by the first coating correction unit 12, this three-dimensional video 100' is subjected to processing for being projected onto a display surface of the projector as the irradiation light projection unit 2. In this processing, an arithmetic operation is performed as to on which position of the irradiation target object 20 a projection surface of the irradiation light projection unit 2 is projected at the time when the coating light is projected onto the irradiation target object from an installation position of the irradiation light projection unit 2. Then, in this processing, a correlation between the projection surface of the irradiation light projection unit 2 and each pixel of the two-dimensional video 100 is obtained based on a correlation between the projection surface of the irradiation light projection unit 2 and the coordinate of the irradiation target object 20, and on the correlation between the coordinate of the irradiation target object 20 and each pixel of the two-dimensional video 100, which is obtained by the above-described mapping processing. In such a way, the first coating correction unit 12 converts the two-dimensional video 100, and reconfigures the two-dimensional video 100 into a two-dimensional video 100'' shown in FIG. 5(e). Note that this processing will be described more in detail with reference to FIG. 8 to FIG. 13.

By performing the mapping processing as described above, the first coating correction unit 12 can obtain a video, in which the two-dimensional video 100 supplied from the irradiation light generation unit 11 is mapped only onto the irradiation target object 20 having the arbitrary shape, and is not mapped onto the portion other than the irradiation target object 20. The video thus subjected to the mapping processing becomes a video signal for projecting the coating light onto the irradiation target object 20 by the first coating correction unit 12. As opposed to the coating light, the background light becomes a video signal that becomes a video portion other than the video portion corresponding to the coating light. The first coating correction unit 12 supplies an irradiation light signal, which includes the video signal of the coating light projected onto the irradiation target object 20 and the video signal of the background light, to the second coating correction unit 13.

Here, in the case of a correctly opposed state where a central axis of the projection range of the irradiation light projection unit 2 and a center position (origin position) of the irradiation target object 20 coincide with each other, the irradiation target object 20 can be coated with the coating light with high accuracy by the irradiation light signal corrected by the above-described mapping processing. However, in the case where the origin position of the irradiation target object 20 and the central axis of the projection range of the irradiation light projection unit 2 are not correctly opposed to each other in terms of an arrangement relationship, only by the first coating correction unit 12, sufficient correction cannot be performed in order to coat the irradiation target object 20 with the coating light with high accuracy. Specifically, in the case where an optical axis of the irradiation light projection unit 2 shifts from the origin position of the irradiation target object 20, it is necessary to correct the irradiation light signal by taking the position of the irradiation light projection unit 2 as a parameter.

For this purpose, the coating lighting apparatus further performs correction processing for the irradiation light signal by the second coating correction unit 13 in response to a relationship between the original position of the irradiation target object 20 and the position of the irradiation light projection unit 2. This correction processing implements parallel displacement conversion and rotational displacement conversion for a video display parameter necessary in the event of video creation, and thereby changes the video display parameter. In this case, along the irradiation light projection range, the video display parameter is converted into a value asymmetric in the vertical and lateral direction, and the video display parameter is changed. In such a way, the coating lighting apparatus further corrects the outline of the coating light so that the coating light can be projected only onto the irradiation target object 20 with high accuracy even if the irradiation light is projected in an arbitrary direction from the irradiation light projection unit 2 onto the irradiation target object 20.

Specifically, the second coating correction unit 13 receives the position of the irradiation target object 20 and the position of the irradiation light projection unit 2 in advance, and acquires in advance a correction parameter as a posture parameter of the irradiation target object 20 with respect to the irradiation light projection unit 2. Then, the second coating correction unit 13 executes the parallel displacement conversion and the rotational displacement conversion based on the correction parameter.

Moreover, the coating lighting apparatus may correct the irradiation light signal also in consideration of performance of the irradiation light projection unit 2, such as a projection angle of view thereof and an optical axis shift amount thereof, and a position of an observer, as well as the positional relationship between the irradiation light projection unit 2 and the irradiation target object 20. Specifically, the coating lighting apparatus receives the preset position of the observer, the shape of the irradiation target object 20, and relative positions and postures of the irradiation light projection unit 2 and the irradiation target object 20, and creates a correction table in advance as a correction parameter enabling the irradiation light to coat the irradiation target object 20 with high accuracy at the time when the irradiation light is projected thereonto. This correction table is a correspondence map between the two-dimensional projection surface and the projection surface of the irradiation target object 20 having the arbitrary shape. This correspondence map is the one for performing the coordinate conversion in accordance with the correction table concerned, and converting the video signal for the two-dimensional display into an output video signal for displaying the arbitrary shape for each pixel of the irradiation light signal.

Moreover, the correction table as described above may be created in advance for each position of the observer, each shape of the irradiation target object 20, and each relative position and posture of the irradiation light projection unit 2 and the irradiation target object 20, and the second coating correction unit 13 may be allowed to select the correction table, and to perform the correction.

Furthermore, in the case of projecting the coating light of the video onto the irradiation target object 20 as described above, then as shown in FIG. 7, it is desirable that this coating lighting apparatus include a third coating correction unit 21 that performs video distortion correction processing by taking a viewpoint position of the observer as a correction parameter.

In this third coating correction unit 21, a correction table is stored, which is, in the case where a recommended viewpoint position for the irradiation target object 20 is present in advance, for correcting video distortion at the time when the irradiation target object 20 is observed from the viewpoint position concerned. Then, in the case of being supplied with the irradiation light signal from the second coating correction unit 13, the third coating correction unit 21 performs the coordinate conversion for each pixel of the irradiation light signal in accordance with the correction table, and forms a video free from the video distortion. In such a way, the coating lighting apparatus can distort the video light in order that the video projected onto the irradiation target object 20 can be observed without distortion in the case where the video concerned is visually recognized from the viewpoint position of the observer.

Moreover, in the case of having received a value obtained by measuring the viewpoint position of the observer, the third coating correction unit 21 may calculate a viewpoint position parameter from the value thus measured. In such a way, the third coating correction unit 21 can generate coating light that coats the irradiation target object 20 so that the irradiation target object 20 can be observed without distortion from the viewpoint position even after the viewpoint position is moved.

As described above, in accordance with the coating lighting apparatus to which the present invention is applied, the irradiation light signal is corrected based on the shape of the irradiation target object 20, and further, the irradiation light signal is corrected based on the positional relationship between the irradiation light projection unit 2 and the irradiation target object 20. Accordingly, the coating light can be irradiated only onto the irradiation target object 20 with high accuracy.

Moreover, in accordance with this coating lighting apparatus, a video corrected in advance so as to eliminate the distortion from the irradiation target object 20 composed of an irregular shape, which includes furniture and the like, can be projected thereonto. For example, a video of a car is projected onto such an irradiation target object 20 having a shape of a car, whereby a presentation of a vehicle design, and the like can be given. Furthermore, the coating lighting apparatus can be put to good use for a billboard having an arbitrary shape, decoration and the like.

Figure 6:
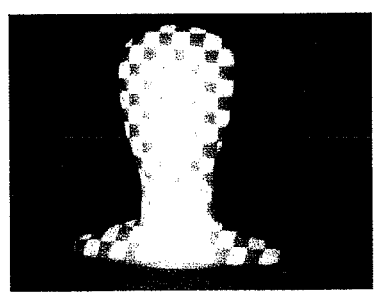
FIGS. 6A and 6B are views showing states where irradiation light patterns are selected by the coating lighting apparatus to which the present invention is applied, and the object as the irradiation target is coated thereby.
Figure 6:
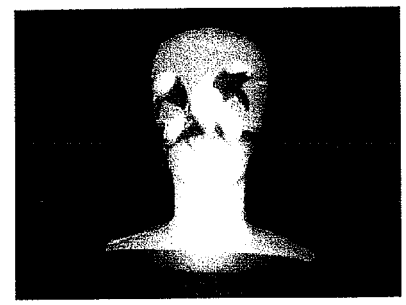
Figure 7:
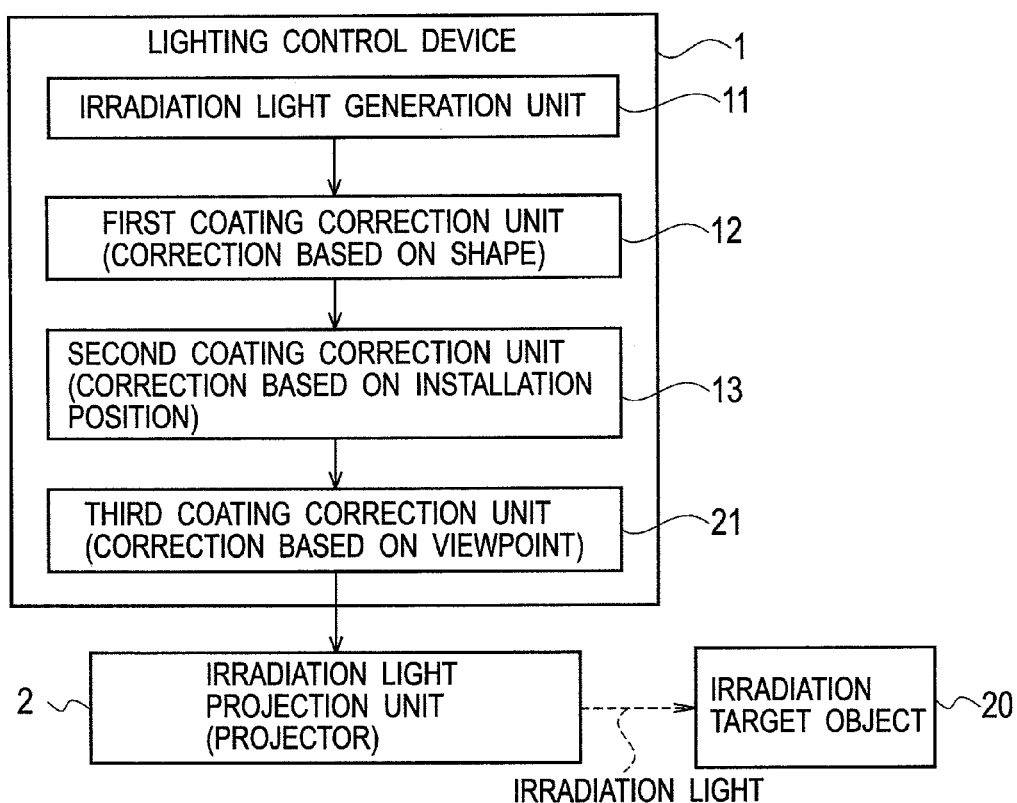
FIG. 7 is a block diagram showing another configuration of the coating lighting apparatus to which the present invention is applied.

Next, it will be described that, in the above-mentioned coating lighting apparatus, even if a video is projected onto the irradiation target object 20 having the arbitrary shape as in FIG. 6 or FIG. 7, the video can be seen without distortion.

Figure 8:
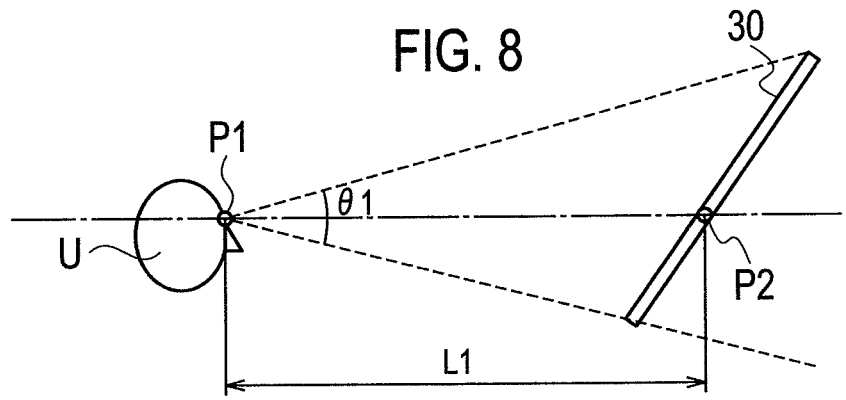
FIG. 8 is a view showing an eye-point position, viewing angle and distance of a user with respect to a flat object as the irradiation target in the coating lighting apparatus to which the present invention is applied.
Figure 9:
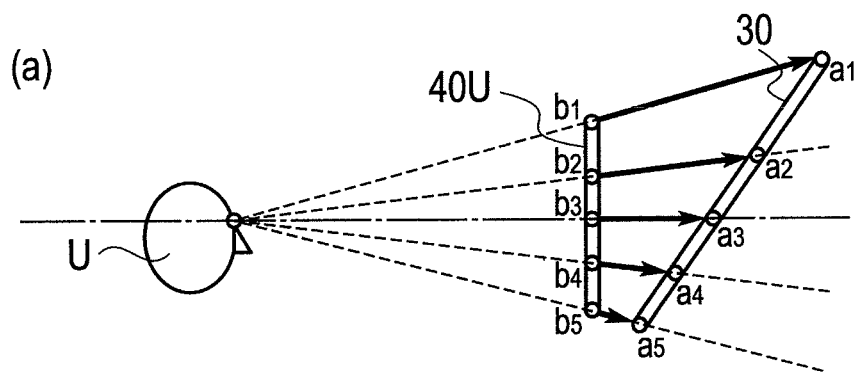
FIGS. 9(a) and 9(b) are views explaining a video visually recognized by the user when the flat object as the irradiation target is viewed from the user in the coating lighting apparatus to which the present invention is applied.
Figure 9:
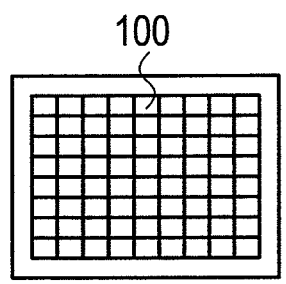

For example as shown in FIG. 8, as the irradiation target object 20 having the arbitrary shape, a flat object 30 is considered, which is spaced from a user L by a distance L, and is arranged so as to be inclined obliquely with respect to the user L. This flat object 30 is visually recognized from a viewpoint position P1 of the user U at a viewing angle θ1. The user U and a point P2 on the flat object 30, which intersects a center of a field of view of the user U, are spaced from each other by a distance L1.

In a positional relationship between the viewpoint position P1 and the point P2 on the flat object 30, there is considered the case of seeing a grid-like two-dimensional image 100 (coating light) shown in FIG. 9(b) on the flat object 30 through a video surface 40U seen from the user U as shown in FIG. 9(a). In this case, in the case of displaying, on the flat object 30, the same video as a video in which the two-dimensional video 100 shown in FIG. 9(b) is displayed on the video surface 40U, it is necessary to acquire a correspondence relationship between each coordinate on the video surface 40U and each coordinate on the flat object 30. Though schematically shown in FIG. 9(a), points b1, b2, b3, b4 and b5 on the video surface 40U correspond to points a1, a2, a3, a4 and a5 on the flat object 30. Hence, videos displayed on the points a1, a2, a3, a4 and a5 on the flat object 30 are visually recognized as the points b1, b2, b3, b4 and b5 on the video surface 40U from the user U.

Figure 10:
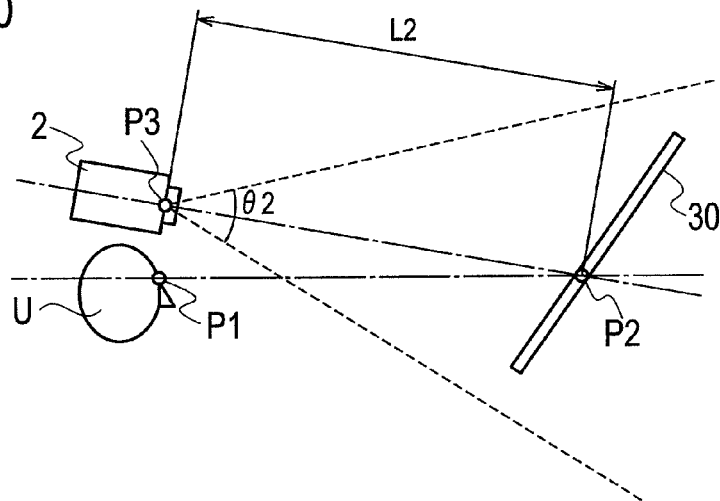
FIG. 10 is a view explaining a projection position, projection image angle and, distance of an irradiation light projection unit with respect to the flat object as the irradiation target in the coating lighting apparatus to which the present invention is applied.
Figure 11:
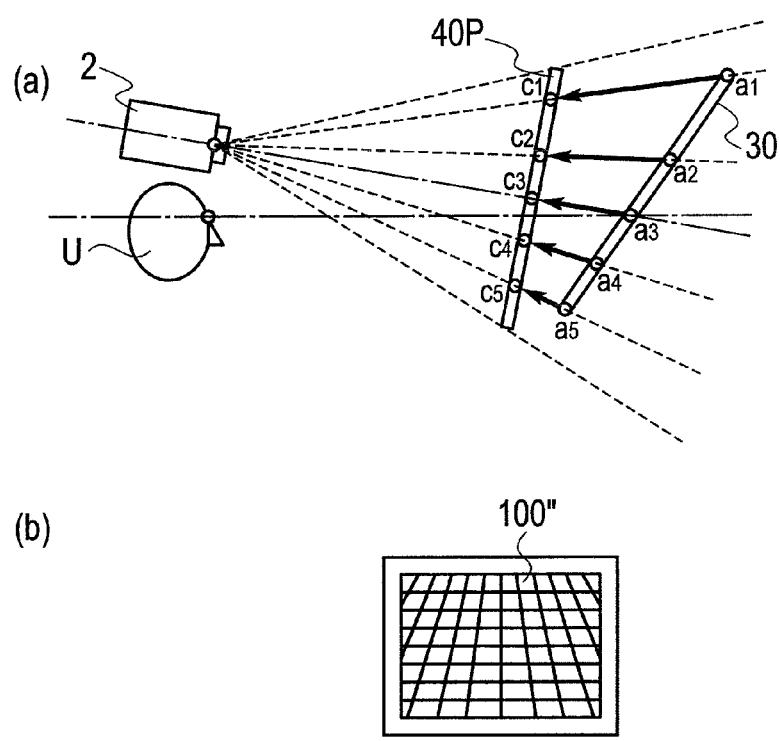
FIGS. 11(a) and 11(b) are views explaining a state where light is projected onto the flat object as the irradiation target from the irradiation light projection unit in the coating light device to which the present invention is applied.

Moreover, as shown in FIG. 10, the point P2 where a line of sight of the user U and the flat object 30 intersect each other and a projection position P3 of the irradiation light projection unit 2 are spaced from each other by a distance L2. Moreover, the irradiation light projection unit 2 projects the projection light within a range of a predetermined projection angle of view θ2.

In this case, with regard to a positional relationship between a video surface 40P of the irradiation light projection unit 2 and the flat object 30, as shown in FIG. 11(a), the points a1, a2, a3, a4 and a5 on the flat object 30 correspond to points c1, c2, c3, c4 and c5 on the video surface 40P. In other words, points on straight lines extended from the projection position P3 of the irradiation light projection unit 2 through the points c1, c2, c3, c4 and c5 on the video surface 40P become the points a1, a2, a3, a4 and a5 on the flat object 30.

The viewpoint position P1 and viewing angle θ1 of the user U, the position of the flat object 30, and the projection position P3 and projection angle of view θ2 of the irradiation light projection unit 2 have the relationships thereamong as described above. Accordingly, when videos are projected onto the points c1, c2, c3, c4 and c5 on the video surface 40P in the irradiation light projection unit 2 shown in FIG. 11(a), the videos are projected onto the points a1, a2, a3, a4 and a5 on the flat object 30. As a result, the points a1, a2, a3, a4 and a5 on the flat object 30 are visually recognized as the points b1, b2, b3, b4 and b5 on the video surface 40U in FIG. 9. Hence, in order to allow the user U to visually recognize the two-dimensional video 100, it is necessary for the irradiation light projection unit 2 to project the two-dimensional video 100", which is distorted as shown in FIG. 11(b), based on a correspondence relationship between each coordinate on the flat object 30, which corresponds to each coordinate on the video surface 40U, and each coordinate on the flat object 30, which corresponds to each coordinate on the video surface 40P.

In order to realize a projection operation of the coating light, which is as described above, as shown in FIG. 9, the lighting control device 1 acquires a viewpoint position/posture parameter that indicates a viewpoint position indicating the viewpoint position P1 of the user U and indicates a line-of-sight direction of the user U, and acquires a viewing angle parameter that indicates the viewing angle θ1 of the user U. These parameters of the user U determine the above-mentioned video surface 40U.

Moreover, the lighting control device 1 acquires shape data of the flat object 30 onto which the coating light emitted from the irradiation light projection unit 2 is projected. This shape data is, for example, CAD data. Here, the viewpoint position/posture parameter is the one in which positions on X-, Y- and Z-axes and rotation angles about the axes in a three-dimensional coordinate space are numerically defined. This viewpoint position/posture parameter uniquely determine the distance L1 between the viewpoint position P1 and the flat object 30, and the posture of the flat object 30 with respect to the viewpoint position P1. Moreover, the shape data of the flat object 30 is the one in which a shape region in the three-dimensional coordinate space is defined based on electronic data created by CAD and the like. This shape data uniquely determine the shape of the flat object 30 viewed from the viewpoint position P1. The shape data of the flat object 30, which is as described above, and the parameters of the user U determine the correspondence relationship between the coordinate of the video surface 40U and the coordinate of the flat object 30.

Furthermore, for the fact that the irradiation light projection unit 2 is installed as shown in FIG. 10, the lighting control device 1 acquires a position/posture parameter that indicates the projection position P3 of the irradiation light projection unit 2 and an optical axis direction of the irradiation light projection unit 2 concerned, and acquires a projection angle-of-view parameter that indicates the projection angle of view θ2 of the irradiation light projection unit 2. These position/posture parameter and projection angle-of-view parameter of the irradiation light projection unit 2 indicate the video surface 40P projected onto the flat object 30 by the irradiation light projection unit 2. When this video surface 40P is determined, it is determined onto which coordinate of the flat object 30 the coating light projected from the irradiation light projection unit 2 is projected through the video surface 40P. In other words, the position/posture parameter and projection angle-of-view parameter of the irradiation light projection unit 2 and the position/posture parameter and shape data of the flat object 30 uniquely determine the range of the flat object 30 covered with the coating light emitted from the irradiation light projection unit 2. In the case where the irradiation light projection unit 2 is the projector, the projection position P3 is defined by a back focus and specified projection angle thereof, and the projection angle of view θ2 is calculated from a horizontal and vertical projection range located apart from the projection position P3 by a fixed distance.

Then, the lighting control device 1 arranges pixels on intersections (c1, c2, c3, c4, c5) between the video surface 40P and the straight lines which connect the pixels (a1, a2, a3, a4, a5) of the coating light displayed on the flat object 30 and the projection position P3 of the irradiation light projection unit 2 to each other, thereby composes the two-dimensional video 100", and projects the two-dimensional video 100" onto the flat object 30. Then, the user U can be allowed to visually recognize the video free from the distortion through such a route of the points c1, c2, c3, c4 and c5 on the video surface 40P, the points a1, a2, a3, a4 and a5 on the flat object 30, and the points b1, b2, b3, b4 and b5 on the video surface 40U.

Figure 12:
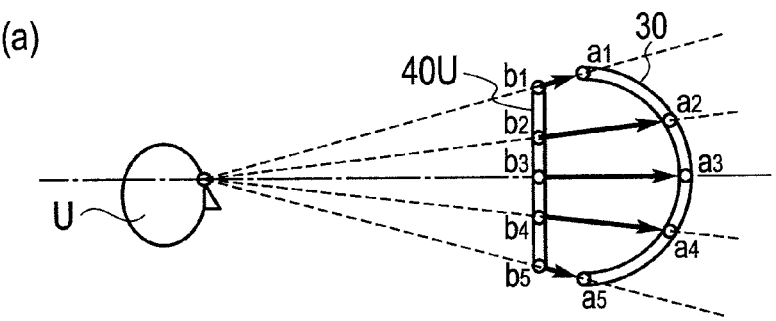
FIGS. 12(a) and 12(b) are views explaining a video visually recognized by the user when a dome-like object as the irradiation target is viewed from the user in the coating lighting apparatus to which the present invention is applied.
Figure 12:
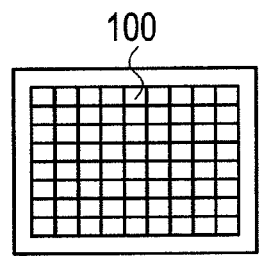
Figure 13:
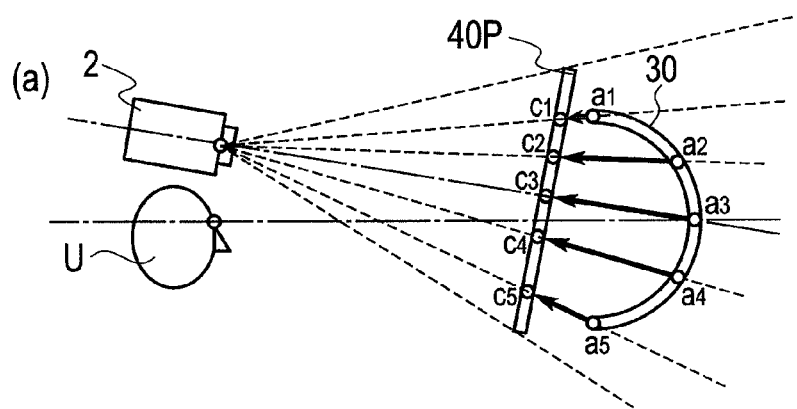
FIGS. 13(a) and 13(b) are views explaining a state where the light is projected onto the dome-like object as the irradiation target from the irradiation light projection unit in the coating lighting apparatus to which the present invention is applied.
Figure 13:
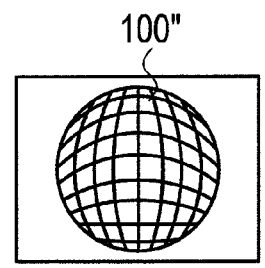

In a similar way, even if the irradiation target object 20 does not have such a shape of the flat object 30 but has a dome shape, such a dome-like irradiation target object 20 can be coated without distortion, and the user U can be allowed to visually recognize the irradiation target object 20 concerned. The case is considered, where the irradiation target object 20 is a dome-like object 30 as shown in FIG. 12(a), and the user U can be allowed to visually recognize grid-like coating light as shown in FIG. 12(b). In this case, from the user U, visually recognized are points a1, a2, a3, a4 and a5 on the dome-like object 30, which are located on extensions of the points b1, b2, b3, b4 and b5 on the video surface 40U. While the points a1, a2, a3, a4 and a5 are visually recognized as described above, the irradiation light projection unit 2 projects the projection light onto the video surface 40P as shown in FIG. 13(a). The projection light that has passed through the points c1, c2, c3, c4 and c5 on the video surface 40P is projected onto the points a1, a2, a3, a4 and a5 on the dome-like object 30, and is visually recognized as the points b1, b2, b3, b4 and b5 on the video surface 40U shown in FIG. 12(a). Hence, the irradiation light projection unit 2 projects a two-dimensional video 100", which is distorted as shown in FIG. 13(b), onto the video surface 40P. While the irradiation light projection unit 2 projects the two-dimensional video 100" as described above, the user U can visually recognize a two-dimensional video 100 without distortion as shown in FIG. 12.

Next, a description will be made of configurations obtained by adding new components to the above-mentioned coating lighting apparatus.

"Irradiation Light Pattern"

Moreover, in this coating lighting apparatus, the irradiation light generation unit 11 may include: an irradiation light pattern storage unit that prestores a plurality of irradiation light signals of irradiation light patterns; and an irradiation light pattern selection unit that selects any of the irradiation light patterns stored in the irradiation light pattern storage unit. This irradiation light pattern storage unit is composed of a storage (not shown), and this irradiation light pattern selection unit is composed of an operation interface and the like, which select any of the irradiation light patterns.

As the plurality of irradiation light patterns, there are mentioned: an irradiation light pattern that coats the irradiation target object 20 with the monochromatic coating light as shown in FIG. 3; an irradiation light pattern that coats the irradiation target object 20 with coating light of a predetermined design as shown in FIG. 6(a); an irradiation light pattern that coats the irradiation target object 20 with coating light of a video as shown in FIG. 6(b); and the like.

The irradiation light generation unit 11 in the coating lighting apparatus as described above includes an operation interface that selects the irradiation light pattern, which is operated, for example, by an administrator of the coating lighting apparatus, or by an observer, and selects any of the irradiation light patterns based on the operation of the operation interface. Then, the irradiation light generation unit 11 supplies the selected irradiation light pattern to the first coating correction unit 12 and the second coating correction unit 13.

Thereafter, the first coating correction unit 12 and the second coating correction unit 13 correct an irradiation light signal of the irradiation light pattern selected by the irradiation light pattern selection unit. The irradiation light projection unit 2 projects the irradiation light signal thus corrected, and thereby can coat the irradiation target object 20 with the coating light of the irradiation light pattern selected by the irradiation light pattern selection unit.

The coating lighting apparatus as described above can switch the irradiation light pattern for use simply and instantaneously by preparing the plurality of irradiation light patterns in advance.

"Leak Light Suppression"

Figure 14:
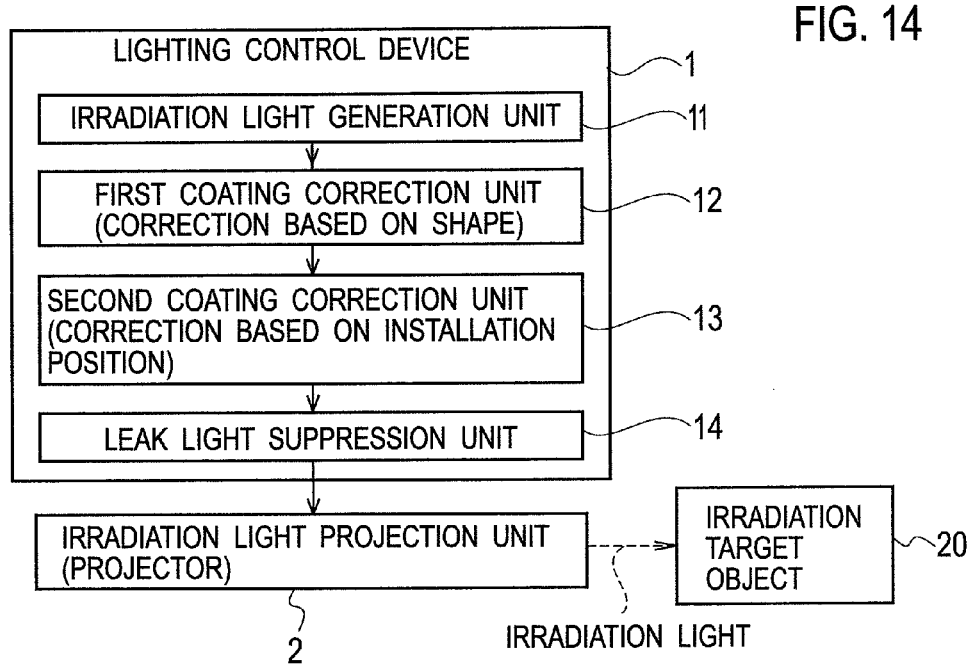
FIG. 14 is a block diagram showing a configuration of suppressing leak light that leaks from the object as the irradiation target to a back thereof in the coating lighting apparatus to which the present invention is applied.

Moreover, as shown in FIG. 14, the lighting control device 1 in this coating lighting apparatus may include a leak light suppression unit 14 that suppresses leak light leaking from the irradiation target object 20 and projected onto the back thereof.

Here, the above-mentioned coating lighting apparatus projects the coating light so as to coat the irradiation target object 20 having the arbitrary shape. Hence, in the case of attempting to accurately coat up to an edge portion of the irradiation target object 20 with the coating light, the coating light partially goes out of the irradiation target object 20, and is projected as leak light onto the back thereof. This leak light is caused by minute deviations of the position/posture parameters of the irradiation light projection unit 2 and the irradiation target object 20, and by an individual difference of the irradiation light projection unit 2 (projector) from others. However, these parameters and accuracy of the instrument concerned have limitations, and accordingly, it is extremely difficult to correct the video signal so that the irradiation target object 20 can be perfectly coated so as not to cause the leak light.

In this connection, this coating lighting apparatus processes the video signal corrected by the first coating correction unit 12 and the second coating correction unit 13, and in such a way, the coating lighting apparatus does not cause the leak light, but makes the caused leak light inconspicuous.

The leak light suppression unit 14 is supplied with the video signal corrected by the first coating correction unit 12 and the second coating correction unit 13. For the supplied video signal, the leak light suppression unit 14 implements processing for suppressing the leak light, and supplies the video signal thus subjected to the processing to the irradiation light projection unit 2.

Figure 15:
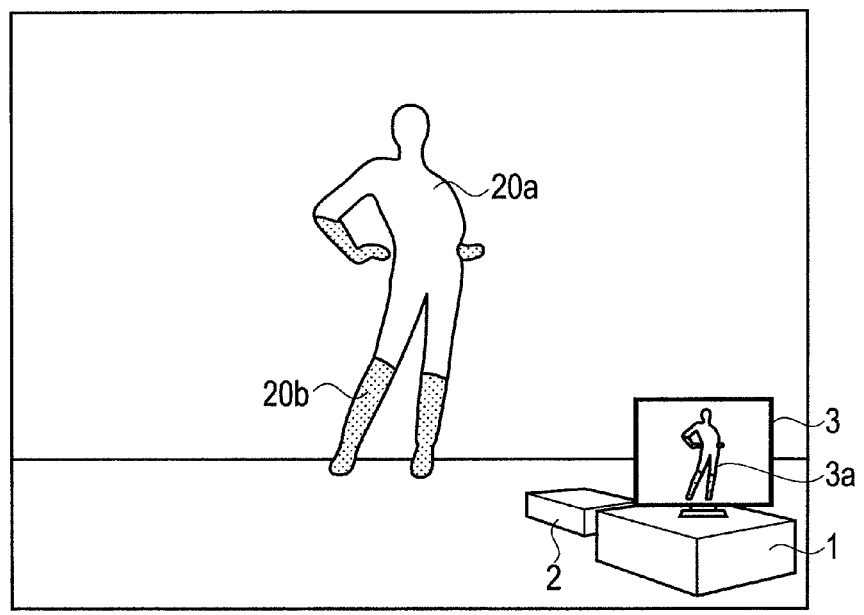
FIG. 15 is a view showing that coating light is not projected onto regions with a predetermined size or less in the coating lighting apparatus to which the present invention is not applied.

As such leak light suppression processing of the leak light suppression unit 14, mentioned is processing for correcting the irradiation light signal so as not to project the coating light onto a region of the irradiation target object 20, which has a preset size or less. Specifically, as shown in FIG. 15, in a human-like irradiation target object 20, though the coating light is projected onto a region 20a thereof larger than a predetermined size, the coating light is not projected onto regions 20b thereof, such as arm and leg top portions, which have the predetermined size of less. In such a way, the coating light projected from the irradiation light projection unit 2 toward the irradiation target object 20 can be suppressed from leaking from the irradiation target object 20 concerned and being projected onto the background of the irradiation target object 20. Note that, in FIG. 15, the coating lighting apparatus includes a monitor device 3 that enables a user to confirm how the coating light is actually projected, and the monitor device 3 is allowed to display a projection state 3a.

Figure 16:
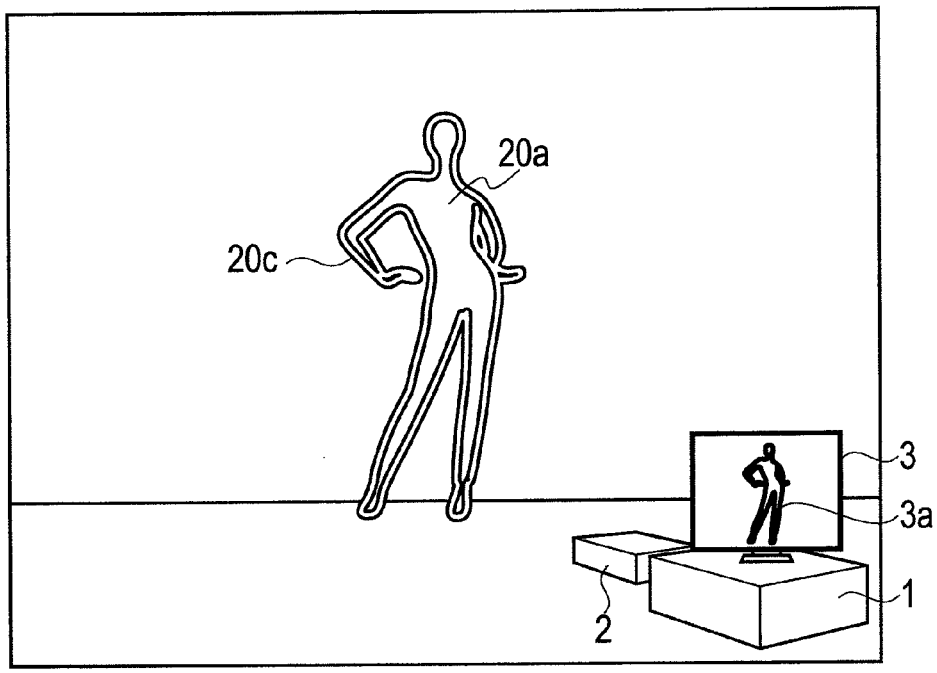
FIG. 16 is a view showing that the coating light is not projected onto an outline portion of the object as the irradiation target in the coating lighting apparatus to which the present invention is applied.

Moreover, as shown in FIG. 16, the leak light suppression unit 14 may change a lighting effect of the coating light projected onto a predetermined-width outline portion 20c of the irradiation target object 20. For example, as the lighting effect, mentioned is that the coating light is not projected onto the outline portion 20c.

In such a way, the lighting control device 1 makes the coating light inconspicuous, which is projected from the irradiation light projection unit 2 toward the irradiation target object 20, and consequently leaks from the irradiation target object 20 concerned and is projected onto the background of the irradiation target object 20. As described above, an occurrence probability of the leak light is increased when the projection regions of the coating light are set on such thin portions and fine portions of the irradiation target object 20, and accordingly, the coating lighting apparatus excludes the regions 20b having the preset size or less.

Figure 17:
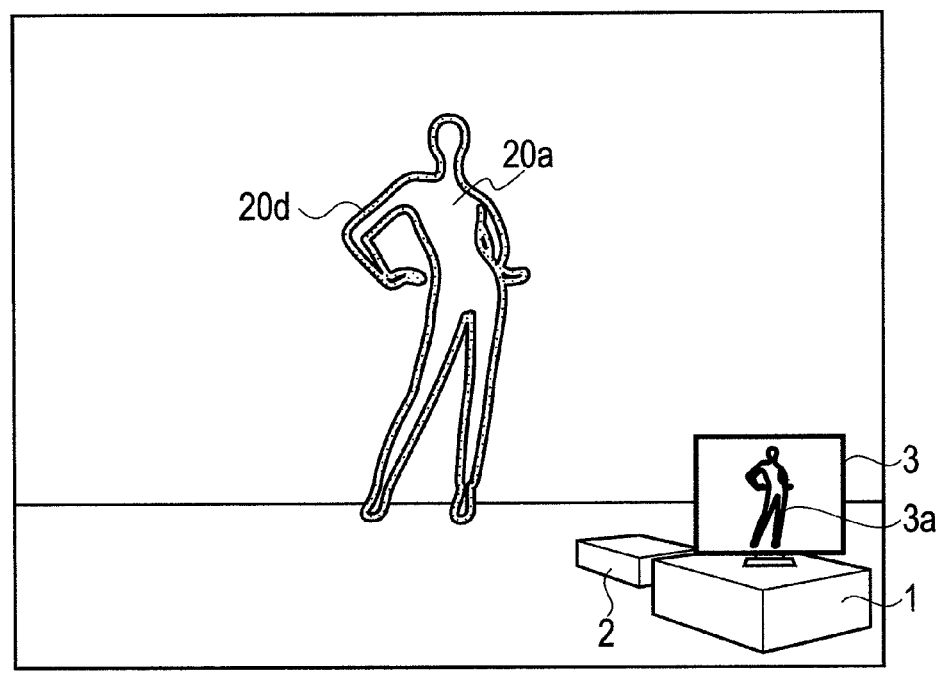
FIG. 17 is a view explaining that a lighting effect for the outline portion of the object as the irradiation target is gradually changed in the coating lighting apparatus to which the present invention is applied.

Moreover, as shown in FIG. 17, the leak light suppression unit 14 may change the lighting effect of the coating light gradually from an inside in a predetermined width of an outline portion 20d toward an outside therein. Also in such a way, the lighting control device 1 can make the coating light inconspicuous, which is projected from the irradiation light projection unit 2 toward the irradiation target object 20, and consequently leaks from the irradiation target object 20 concerned and is projected onto the background of the irradiation target object 20.

Specifically, as the lighting effect changed in the outline portion 20d, mentioned are illuminance, brightness, luminous intensity, a luminous flux, a color temperature, color rendering, and the like. Then, the leak light suppression unit 14 changes the lighting effect of the coating light in the outline portion 20d so that the leak light leaking from the irradiation target object 20 cannot become conspicuous even in the case of being projected onto the background. For example, the leak light suppression unit 14 reduces the illuminance of the coating light in the outline portion 20d of the irradiation target object 20, and thereby makes the leak light inconspicuous. Moreover, the leak light suppression unit 14 increases a width of the outline portion 20d in which the illuminance is set at zero, thereby gradually reduces the projection region of the coating light, and can gradually reduce the leak light. Furthermore, the leak light suppression unit 14 may increase the width of the outline portion 20d until the leak light disappears. Note that, desirably, the outline portion 20d set in order to reduce the leak like is decided in response to a reduced area of the projection region of the coating light.

Figure 18:
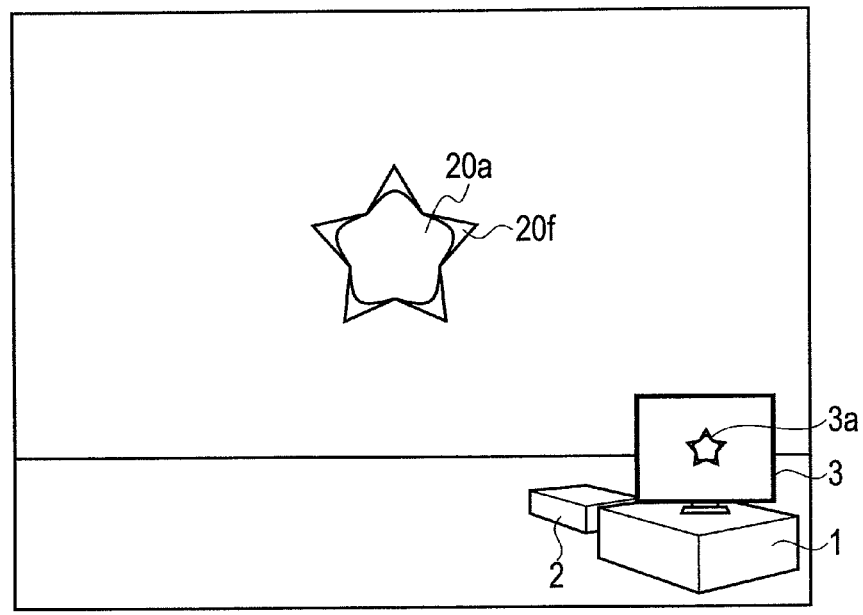
FIG. 18 is a view showing that rounded coating light is projected onto acute portions of the object as the irradiation light in the coating lighting apparatus to which the present invention is applied.

Still further, as shown in FIG. 18, the leak light suppression unit 14 may correct the video signal so as not to project the coating light onto acute portions in a star-like irradiation target object 20. In this case, the leak light suppression unit 14 processes acute portions of the coating light so as to be rounded. In such a way, the acute portions concerned become regions 20f onto which the coating light is not projected. While the leak light is prone to occur in the acute portions as described above, the coating light is rounded to thereby suppress the occurrence of the leak light.

Still further, the leak light suppression unit 14 may oscillate, by a predetermined width, the coating light projected by the irradiation light projection unit 2. In such a way, even if the coating light that is not projected onto the irradiation target object 20 occurs as the leak light, the illuminance thereof visually recognized from the user U can be decreased by such oscillations. Hence, in accordance with the leak light suppression unit 14, the coating light can be made inconspicuous, which is projected from the irradiation light projection unit 2 toward the irradiation target object 20, and consequently leaks from the irradiation target object concerned and is projected onto the background of the irradiation target object.

Figure 19:
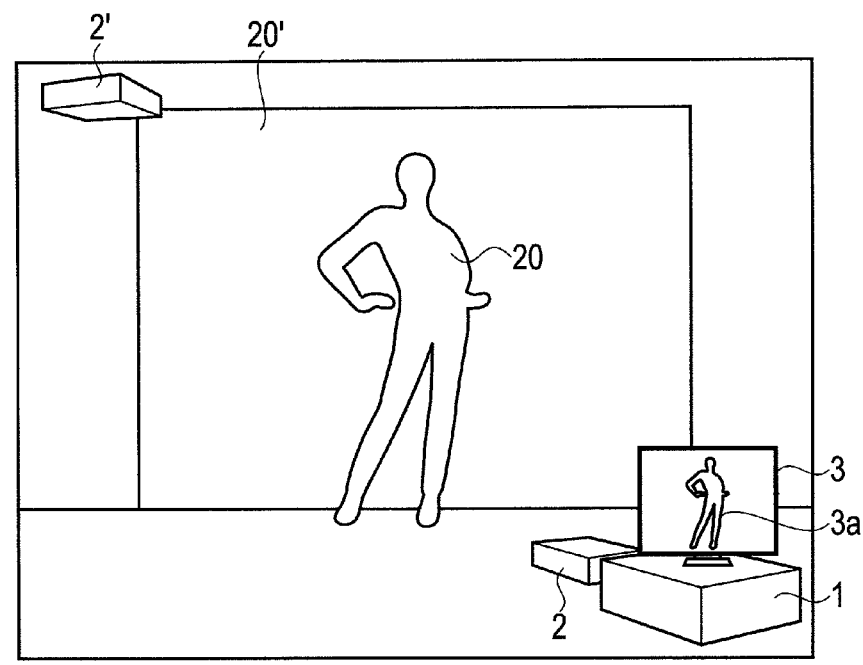
FIG. 19 is a front view explaining that an irradiation light projection unit that projects back light onto the back of the object as the irradiation target is arranged separately from the irradiation light projection unit that coats the object as the irradiation target.
Figure 20:
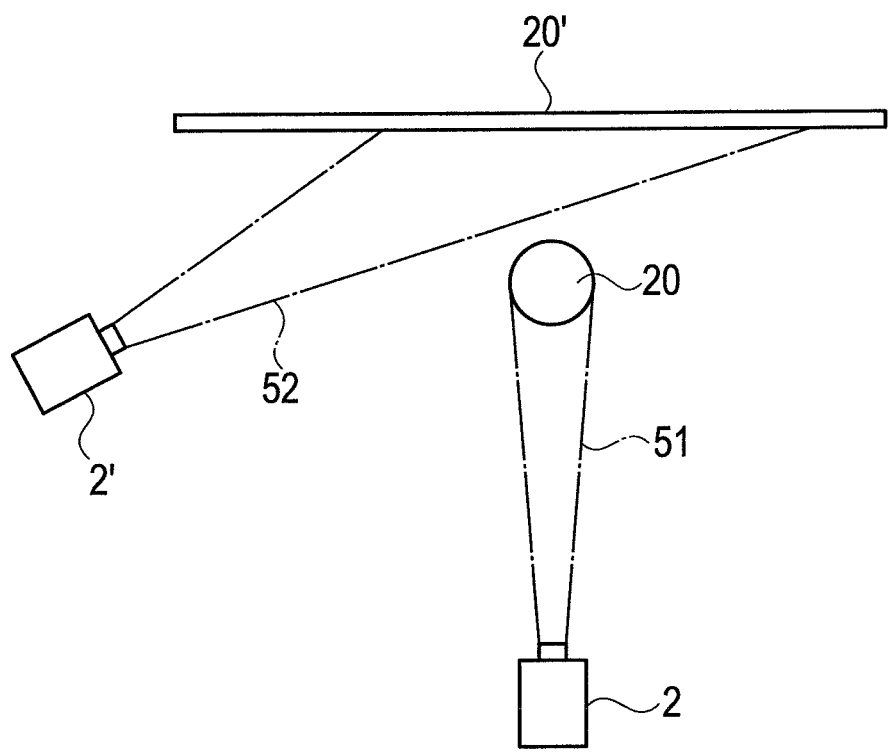
FIG. 20 is a top view explaining that the irradiation light projection unit that projects the back light onto the back of the object as the irradiation target is arranged separately from the irradiation light projection unit that coats the object as the irradiation target.

Still further, as a component of suppressing the leak light, as shown in FIG. 19, an irradiation light projection unit 2' that projects background light of suppressing the leak light onto a back surface 20' of the irradiation target object 20 may be provided besides the irradiation light projection unit 2 that projects the coating light onto the irradiation target object 20. As shown in FIG. 20, this irradiation light projection unit 2' is installed so that a projection range 52 thereof cannot be included in the irradiation target object 20. In such a way, even if the leak light occurs on the back surface 20' since a projection range 51 of the coating light of the irradiation light projection unit 2 shifts from the irradiation target object 20, the leak light can be made inconspicuous by the background light.

The light projected onto the back surface 20' just needs to be a lighting effect (illuminance, brightness, luminous intensity, luminous flux, color temperature, color rendering) set so as to make the leak light inconspicuous. For example, the irradiation light projection unit 2' irradiates white light and the like on the back surface 20'. In such a way, the leak light can be made inconspicuous by using property that colors of superimposed pieces of light become the white light.

Figure 21:
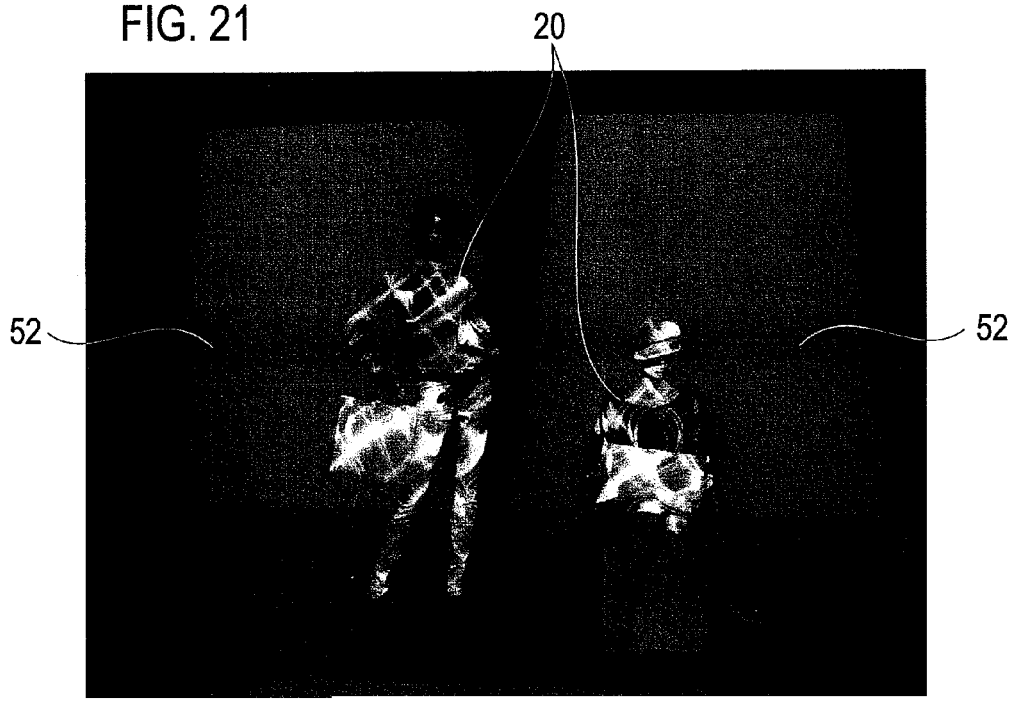
FIG. 21 is a view showing a state where the object as the irradiation target is coated with the coating light by the coating lighting apparatus to which the present invention is applied, and the back light is projected onto the back of the object.
Figure 22:
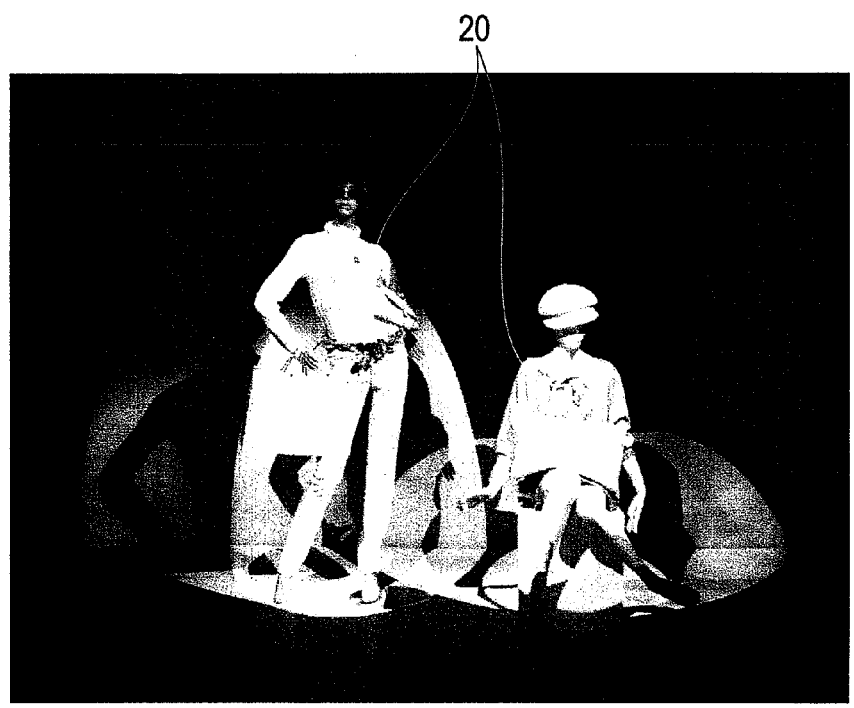
FIG. 22 is a view showing a lighting effect as a comparative example.

As described above, the background light is projected onto the back surface 20'. In such a way, as shown in FIG. 21, the lighting effect can be performed for the back surface 20' by the projection range 52 of the background light at the same time when the irradiation target object 20 is coated with the coating light. In this example shown in FIG. 21, the lighting effect for back surfaces 20' of the respective irradiation target objects 20 is performed by using two irradiation light projection units 2'. Moreover, while the lighting effect is performed for the respective irradiation target objects 20 by using two irradiation light projection units 2 as shown in FIG. 22, in the example shown in FIG. 21, the respective irradiation target objects 20 can be coated by using two irradiation light projection units 2 for each of the irradiation target objects 20.

"Reflecting Mirror"

Moreover, this coating lighting apparatus arranges a reflecting mirror on the optical axis between the irradiation light projection unit 2 and the irradiation target object 20, thereby can adjust a projecting distance of the irradiation light to be long, or can arrange the irradiation light projection unit 2 at a position where the irradiation light projection unit 2 is invisible. Moreover, even in the case of configuring the irradiation light projection unit 2 to be compact, the projection distance of the irradiation light is elongated by the reflecting mirror, whereby an irradiation target object 20 having a relatively large size can be coated.

"Three-Dimensional Video"

Moreover, this coating lighting apparatus may supply irradiation light signals for displaying a three-dimensional video to the irradiation light projection unit 2, and may allow the coating light projected onto the irradiation target object 20 to be observed as the three-dimensional video. This coating lighting apparatus generates an irradiation light signal for a right eye and an irradiation light signal for a left eye, to which a mutual parallax is given, by the irradiation light generation unit 11, and implements, for each of the irradiation light signals, the correction processing by the first coating correction unit 12, the second coating correction unit 13, and the third coating correction unit 21.

In this case, the coating lighting apparatus allows the observer to put on polarization glasses in which polarization directions of the video light transmitting therethrough are different between the right eye and the left eye, and emits plural types of the irradiation light, which are given the mutual parallax and are different in polarization direction, from the irradiation light projection unit 2 by a polarization mode or a time-division mode. In the case of displaying the three-dimensional video on the irradiation target object 20 by the polarization mode, a material that holds the polarization directions of the video light is used as a surface material of the irradiation target object 20, and irradiation light for the right eye and irradiation light for the left eye, which are different in polarization direction, are emitted from two light emitting ports of the irradiation light projection unit 2. Meanwhile, in the case of displaying the three-dimensional video on the irradiation target object 20 by the time-division mode, the irradiation light for the right eye and the irradiation light for the left eye are alternately emitted from one light emitting port in a time-division manner, and emitting timing of the irradiation light for the right eye and the irradiation light for the left eye and switching timing of right-eye and left-eye shutters of liquid crystal shutter glasses are synchronized with each other.

In such a way, in accordance with this coating lighting apparatus, the coating light can be projected only onto the irradiation target object 20 having the arbitrary shape with high accuracy, and the observer can be allowed to observe the three-dimensional video on the irradiation target object 20 without distortion.

"Change of Irradiation Light Projection Range and Coating Range"

The coating lighting apparatus may change the irradiation light projection range of the irradiation light projection unit 2 by adjusting the angle of view of the irradiation light projection unit 2. The coating lighting apparatus as described above can coat the irradiation target object 20 with the coating light in a space of the irradiation light projection range in which the angle of view of the irradiation light projection unit 2 is adjusted.

Moreover, the coating lighting apparatus may designate a space region in the irradiation target object 20, for which the coating is desired to be implemented. In the coating lighting apparatus as described above, the coating light is projected onto such a portion to be coated in the irradiation target object 20, and the background light is projected onto a portion to be uncoated in the irradiation target object 20. A signal that distinguishes the portion to be coated with the coating light and the portion to be uncoated therewith in the irradiation target object 20 as described above is supplied to the coating lighting apparatus in advance. Then, with regard to the irradiation light signal supplied from the irradiation light generation unit 11 to the first coating correction unit 12, the coating lighting apparatus sets, as the coating light, only the portion thereof to be coated in the irradiation target object 20, and modifies other portions thereof to the irradiation light signal indicating the background light, and supplies both types of such irradiation light signals to the first coating correction unit 12.

Moreover, such a portion capable of being coated and the portion to be uncoated may be changed by the observer. For example, the region to be coated in the irradiation target object 20 can be set by percentages in the three-dimensional directions from the origin position (base point), which are designated by the shape parameter of the irradiation target object 20 while defining, as 100%, a state where the entirety of the irradiation target object 20 is coated.

"Coating of Plurality of Irradiation Target Objects 20"

Moreover, in the case of selecting the portions capable of being coated for a plurality of the irradiation target objects 20, all of the irradiation target objects 20 may be coated similarly, or the portions to be coated may be designated for the individual irradiation target objects 20. For example, in the case where the plurality of irradiation target objects 20 are present in the irradiation light projection range of the single irradiation light projection unit 2, a plurality of projection ranges of the coating light can be provided in the irradiation light projection range, and the individual irradiation target objects 20 in the irradiation light projection range can be coated. In this case, it is necessary for the first coating correction unit 12 to perform, on the single two-dimensional video 100, the mapping processing for the shape data 20' of the plurality of irradiation target objects 20.

Moreover, the coating lighting apparatus may select individual irradiation light patterns for the plurality of irradiation target objects 20. In the coating lighting apparatus as described above, the irradiation light patterns are assigned to the individual irradiation target objects 20 by the above-mentioned operation interface that selects the irradiation light patterns. Then, a two-dimensional video 100 that includes the individual irradiation light patterns selected so as to correspond to schematic positions of the individual irradiation target objects 20 with respect to the irradiation light projection unit 2 is generated by the irradiation light generation unit 11, and is subjected to the mapping processing into shapes of the individual irradiation target objects 20 in the irradiation light projection range by the first coating correction unit 12.

Furthermore, the coating lighting apparatus includes irradiation target object identifying means (camera and the like) for individually identifying the plurality of irradiation targets 20 in order to individually assign the irradiation light patterns to the plurality of irradiation target objects 20. Then, the coating lighting apparatus designates any of the irradiation light patterns preset for each of the irradiation target objects 20, and coats the irradiation target object 20 with the designated irradiation light pattern. Moreover, the coating lighting apparatus may detect the distance between the irradiation light projection unit 2 and the irradiation target object 20 by a distance sensor, and may coat the irradiation target object 20 located at a place, in which a distance from the irradiation light projection unit 2 is in a predetermined range, based on the detected distance. Note that the distance between the irradiation light projection unit 2 and the irradiation target object 20 can be detected by measuring a distance between a fixed point of the irradiation light projection unit 2 and a fixed point of the irradiation target object 20 in such a manner that magnetic sensors are attached to the respective fixed points.

"Shape Change of Irradiation Target Object 20"

In the coating lighting apparatus, the shape of the irradiation target object 20 can also be changed in accordance with a preset shape pattern. Note that the position of the irradiation target object 20 is fixed.

The coating lighting apparatus as described above includes a drive mechanism and the like, which change the shape of the irradiation target object 20 in accordance with an operation to the operation interface by the observer and the like. This coating lighting apparatus presets the shape pattern of the irradiation target object 20, which is changed by the drive mechanism, and stores a shape parameter corresponding to the shape pattern of the irradiation target object 20.

Figure 5:
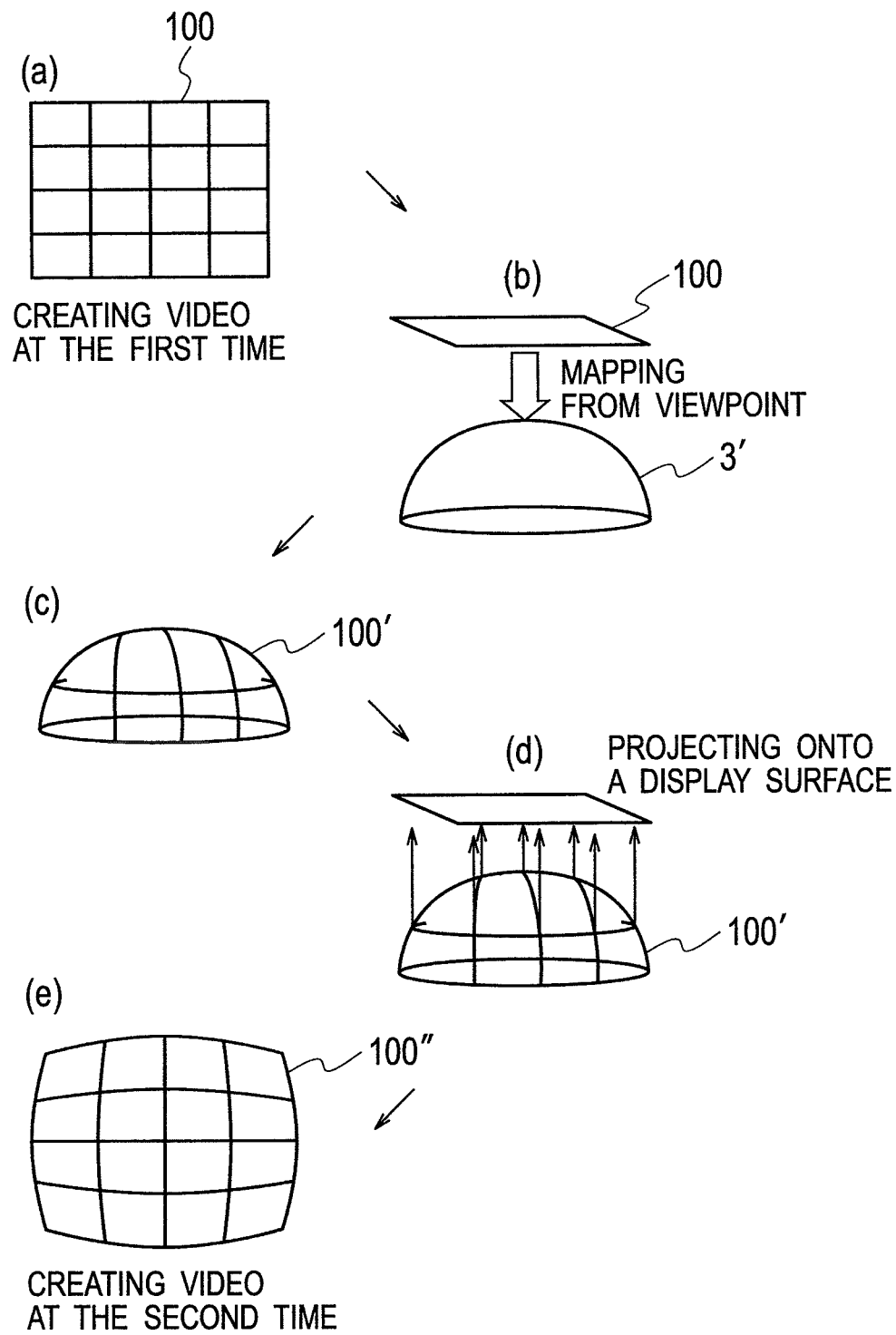
FIGS. 5(a) to 5(e) are views explaining mapping processing of a first coating correction unit in the coating lighting apparatus to which the present invention is applied.

Then, in the case where the shape pattern of the irradiation target object 20 is changed by the drive mechanism, the coating lighting apparatus calls up the shape parameter of the shape pattern concerned, and performs the mapping processing for the irradiation light signal by the first coating correction unit 12 as shown in FIG. 5. In such a way, the shape pattern of the irradiation target object 20 is prestored as the shape parameter, whereby, even if the shape pattern of the irradiation target object 20 is changed, the coating lighting apparatus can simply perform the correction processing by the first coating correction unit 12, and can coat the shape concerned with the irradiation light.

Moreover, following an arbitrary shape change of the irradiation target object 20, the coating lighting apparatus may perform the mapping processing by the first coating correction unit 12. The coating lighting apparatus as described above requires: detecting means, such as a camera, for detecting that the shape of the irradiation target object 20 is arbitrarily changed by the operation interface operated by the observer; and outline detecting means for detecting the outline (shape parameter) of the irradiation target object 20 concerned.

In the case where it is detected by the outline detecting means that the shape of the irradiation target object 20 when the irradiation target object 20 is viewed from the irradiation light projection unit 2 is updated, the coating lighting apparatus as described above performs the mapping processing by the first coating correction unit 12 so as to coat the irradiation target object 20 having the outline (shape parameter) detected by the outline detecting means concerned.

In such a way, even if the irradiation target object 20 is changed to the arbitrary shape, the coating lighting apparatus can update the shape parameter, thereby can perform the mapping processing.

"Display of Symbol"

At the time of coating the irradiation target object 20, the coating lighting apparatus may insert, in a cutting manner, a symbol such as a character and a mark on the irradiation target object 20 thus coated. Note that the positional relationship between the irradiation light projection unit 2 and the irradiation target object 20 is not changed.

The coating lighting apparatus as described above includes: symbol storing means for storing the symbol such as the character, the mark and a figure pattern, each of which is composed of two colors such as black and white; symbol selecting means, such as an operation interface, for selecting the stored symbol; symbol insertion spot designating means for designating a place into which the symbol is to be inserted on the coated irradiation target object 20; symbol diameter setting means for designating a size of the symbol; and cut subject switching means for switching a cut subject (color to be cut between two colors) of the symbol. This symbol insertion spot designating means sets such an insertion spot of the symbol by distances in the three-dimensional directions from the origin position (base point), which are designated by the shape parameter of the irradiation target object 20.

Unlike the above-mentioned irradiation light patterns, the coating lighting apparatus as described above can insert the symbol having the designated size into a designated place of the irradiation light.

Moreover, the coating lighting apparatus can capture and insert an arbitrary symbol such as a character and a figure pattern. This coating lighting apparatus includes: symbol capturing means (for example, scanner) for capturing the arbitrary symbol such as the character and the figure pattern; and symbol image converting means for converting the captured symbol image into an image composed of two colors such as black and white. This coating lighting apparatus can cut and insert the captured symbol into a part of the irradiation light that is coating the irradiation target object 20. For example, this coating lighting apparatus can insert a character and a figure pattern, which are handwritten on a sheet read by the scanner, or an image in stock.

Furthermore, in order to update a cut design in real time, the coating lighting apparatus includes real-time symbol capturing means (for example, tablet PC) for capturing, in real time, the handwritten character or figure pattern as the image composed of two colors. The coating lighting apparatus cuts and inserts the handwritten symbol into a part of the irradiation light that is coating the irradiation target object 20. In such a way, the character or the figure pattern, which is written on the spot, can be inserted, and can be reviewed, and so on.

"Update of Positional Relationship Between Irradiation Light Projection Unit 2 and Irradiation Target Object 20"

In the case where the irradiation target object 20 is mounted on a movable stage, the coating lighting apparatus may automatically follow movement of the irradiation target object 20, and may coat the irradiation target object 20. This coating lighting apparatus includes: irradiation target object moving means for moving the irradiation target object 20; irradiation target object position/posture sensing means for acquiring the position and posture of the irradiation target object 20; and irradiation target object position/posture parameter calculating means for calculating the position/posture parameter from an output value of the position/posture sensing means.

In the case where the position of the irradiation target object 20 is changed, the coating lighting apparatus as described above acquires the position and posture of the irradiation target object 20, and calculates the position/posture parameter from the acquired position and posture of the irradiation target object 20 with respect to the irradiation light projection unit 2. In such a way, even if the irradiation target object 20 moves, the coating lighting apparatus corrects the irradiation light signal by the second coating correction unit 13 based on the arrangement of the irradiation light projection unit 2 and the irradiation target object 20, thereby can coat the irradiation target object 20 with high accuracy.

Moreover, in the case where the irradiation light projection unit 2 is mounted on the movable stage, the coating lighting apparatus may automatically follow movement of the irradiation light projection unit 2, and may coat the irradiation target object 20. This coating lighting apparatus includes: irradiation light projection unit moving means for moving the irradiation light projection unit 2; irradiation light projection unit position/posture sensing means for acquiring the position and posture of the irradiation light projection unit 2; and irradiation light projection unit position/posture parameter calculating means for calculating the position/posture parameter from an output value of the position/posture sensing means.

In the case where the position of the irradiation light projection unit 2 is changed, the coating lighting apparatus as described above acquires the position and posture of the irradiation light projection unit 2, and calculates the position/posture parameter from the acquired position and posture of the irradiation target object 20 with respect to the irradiation light projection unit 2. In such a way, even if the irradiation light projection unit 2 moves, the coating lighting apparatus corrects the irradiation light signal by the second coating correction unit 13 based on the arrangement of the irradiation light projection unit 2 and the irradiation target object 20, thereby can coat the irradiation target object 20 with high accuracy. For example, in a situation where the observer stands between the irradiation light projection unit 2 and the irradiation target object 20 and shades (shadows) the irradiation light, even in the case where the irradiation light projection unit 2 is moved in a direction of avoiding such a shadow, the position of the irradiation light projection unit 2 is sensed so as to be followed, whereby the irradiation target object 20 can be continued to be coated with the coating light.

Note that, as mentioned above, in the configuration in which the reflecting mirror is provided on the optical axis between the irradiation light projection unit 2 and the irradiation target object 20, a virtual position of the irradiation light projection unit 2, which is set in consideration of reflection thereof on the reflecting mirror, is inputted as the position/posture parameter of the irradiation light projection unit 2 to the second coating correction unit 13, whereby the irradiation light signal is corrected.

Note that the above-mentioned embodiment is merely an example of the present invention. Therefore, it is a matter of course that the present invention is not limited to the above-mentioned embodiment, and that a variety of alterations other than the embodiment are possible in response to design and the like within the scope without departing from the technical concept according to the present invention.

Industrial Applicability

In accordance with the present invention, the outline of the coating light in the irradiation light is cut in conformity with the shape of the irradiation target object, and further, the outline of the coating light is corrected in response to the positional relationship between the origin position of the irradiation target object and the irradiation light projecting means. Therefore, the irradiation target object can be coated with the irradiation light with high accuracy based on the shape of the irradiation target object and the positional relationship between the irradiation target object and the irradiation light projection unit.

The invention claimed is:

1. A lighting apparatus that projects irradiation light toward an irradiation target object having an arbitrary shape, comprising:

an irradiation light signal input configured to receive an irradiation light signal;

a coating corrector configured to correct the irradiation light signal received by the irradiation light signal input so that the irradiation target object can be coated with the irradiation light when the irradiation light is irradiated onto the irradiation target object; and irradiation light projector configured to project the irradiation light onto the irradiation target object by using the irradiation light signal corrected by the coating corrector, wherein the irradiation light includes coating light that coats the irradiation target object, and background light that becomes a background of the irradiation target object, wherein the coating corrector corrects the irradiation light signal so as to correct an outline of the coating light in the irradiation light, and the coating corrector comprising:

a first coating corrector configured to correct the irradiation light signal so as to cut the outline of the coating light in the irradiation light in conformity with the shape of the irradiation target object; and a second coating corrector configured to correct the outline of the coating light, the outline being corrected by the first coating corrector, in response to a positional relationship between an origin position of the irradiation target object and the irradiation light projector.

2. The lighting apparatus according to claim 1, further comprising:
an irradiation light pattern storage configured to store in advance a plurality of irradiation light signals of irradiation light patterns generated by the irradiation light signal input; and
an irradiation light pattern selector configured to select any of the irradiation light patterns stored in the irradiation light pattern storage, and reading out the irradiation light signal of the selected irradiation light pattern,
wherein the coating corrector corrects the irradiation light signal of the irradiation light pattern selected by the irradiation light pattern selector, and wherein the irradiation light projector projects the corrected irradiation light signal, and coats the irradiation target object with the coating light of the irradiation light pattern selected by the irradiation light pattern selector.

3. The lighting apparatus according to claim 1, wherein a reflecting mirror is arranged between the irradiation light projector and the irradiation target object.

4. The lighting apparatus according to claim 1,
wherein the coating light is a video in which an image is updated in a time base,
it is made possible to input a video signal to the irradiation light signal input, and
the lighting apparatus further comprises:
viewpoint position/posture input configured to receive a position and posture of a viewpoint of an observer who observes the irradiation target object; and
a third coating corrector configured to correct the video light signal so as to distort video light in order to allow a video projected onto the irradiation target object to be observed without distortion in a case where the video is visually recognized from the viewpoint of the observer, the viewpoint being received by the viewpoint position/posture input.

5. The lighting apparatus according to claim 4, wherein the irradiation light projector emits pieces of video light, to which a mutual parallax is given, from one or a plurality of video light emitting portions, and displays a three-dimensional video on the irradiation target object.

6. The lighting apparatus according to claim 1, further comprising: a leak light suppressor configured to correct the irradiation light signal so that the coating light cannot be projected onto a region of the irradiation target object, the region having a preset size or less.

7. The lighting apparatus according to claim 1, further comprising: a leak light suppressor configured to change a lighting effect of irradiation light projected onto a predetermined-width outline portion of the irradiation target object, and making leak light inconspicuous, the coating light projected by the irradiation light projector, and making leak light inconspicuous, the leak light being leaked from the irradiation target object and being projected onto a background of the irradiation target object.

8. The lighting apparatus according to claim 7, wherein the leak light suppressor changes a lighting effect of the coating light gradually from an inside in a predetermined width of the outline portion toward an outside therein.

9. The lighting apparatus according claim 1, further comprising: leak light suppressor for oscillating by a predetermined width, the coating light projected by the irradiation light projector, and making leak light inconspicuous, the leak light being leaked from the irradiation target object and being projected onto a background of the irradiation target object.

* * * * *